United States Patent
Chen (10) Patent No.: US 10,708,541 B2
(45) Date of Patent: Jul. 7, 2020

(54) VIDEO SIGNAL TRANSMISSION SWITCHING APPARATUS

(71) Applicant: ATEN International Co., Ltd., New Taipei (TW)

(72) Inventor: Sin-Hong Chen, Miaoli County (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/106,879

(22) Filed: Aug. 21, 2018

(65) Prior Publication Data
US 2019/0082141 A1 Mar. 14, 2019

(30) Foreign Application Priority Data
Sep. 12, 2017 (TW) .............................. 106131278 A (51) Int. Cl.
*G06F 13/00* (2006.01)
*H04N 7/10* (2006.01)
(Continued)

(52) U.S. Cl.
CPC ......... *H04N 7/104* (2013.01); *G06F 13/4022* (2013.01); *G06F 13/4282* (2013.01); *G06F 2213/0042* (2013.01)

(58) Field of Classification Search
CPC .... H04N 7/104; H04N 5/268; G06F 13/4022; G06F 13/4282; G06F 2213/0042
See application file for complete search history.

(56) References Cited

U.S. PATENT DOCUMENTS 5,933,192 A * 8/1999 Crosby ............. H04N 21/4263
    348/725
6,101,076 A * 8/2000 Tsai .................... G06F 11/0745
    361/115
(Continued)

FOREIGN PATENT DOCUMENTS

TW       M514141 U    12/2015
TW       I518508 B     1/2016
(Continued)

OTHER PUBLICATIONS

Taiwanese Office Action, dated Aug. 7, 2018, in a counterpart Taiwanese patent application, No. TW 106131278.

*Primary Examiner* — Jefferey F Harold
*Assistant Examiner* — Humam M Satti
(74) *Attorney, Agent, or Firm* — Chen Yoshimura LLP (57) ABSTRACT

A video signal transmission switching apparatus is disclosed. The video signal transmission switching apparatus is coupled between a source apparatus and a plurality of display apparatuses. The video signal transmission switching apparatus includes a controller, a USB Type-C connecting interface, a plurality of video output interfaces and a switching module. The controller is coupled to the source apparatus through the USB Type-C connecting interface at least including a specific channel. The controller is coupled to the plurality of display apparatus through the plurality of video output interfaces respectively. The switching module is coupled to the specific channel and coupled to the plurality of video output interfaces respectively. The switching module detects a specific signal of the plurality of display apparatus and controls the specific channel to re-perform handshaking accordingly.

23 Claims, 3 Drawing Sheets

(51) Int. Cl.
*G06F 13/42* (2006.01)
*G06F 13/40* (2006.01)

(56) References Cited

U.S. PATENT DOCUMENTS

| | | | |
|---|---|---|---|
| 9,559,905 B2 | 1/2017 | Chen et al. | |
| 2010/0064076 A1* | 3/2010 | Chen .................. | G06F 13/4022 710/63 |
| 2011/0037447 A1 | 2/2011 | Mair | |
| 2012/0203937 A1* | 8/2012 | Mohanty ................ | G06F 13/12 710/16 |
| 2013/0171841 A1* | 7/2013 | Ho .......................... | G06F 11/24 439/54 |
| 2014/0180618 A1* | 6/2014 | Xiong ................ | G06F 11/2284 702/83 |
| 2016/0127671 A1* | 5/2016 | Hundal ................ | C08G 59/687 348/723 |
| 2016/0219226 A1 | 7/2016 | Kuo | |
| 2017/0017595 A1* | 1/2017 | Schnell ............... | G06F 13/4022 |
| 2017/0046289 A1* | 2/2017 | Hundal ................. | G06F 13/385 |
| 2017/0116147 A1 | 4/2017 | Hsueh | |
| 2017/0139871 A1 | 5/2017 | Yeh | |
| 2017/0238050 A1* | 8/2017 | Yang ................ | H04N 21/43635 725/74 |
| 2017/0308498 A1* | 10/2017 | Chen ................... | G06F 13/4282 |
| 2017/0364465 A1* | 12/2017 | Tsukamoto ......... | G06F 13/4022 |
| 2017/0373882 A1* | 12/2017 | Doi .................... | H04L 12/40039 |
| 2018/0004694 A1* | 1/2018 | Nemoto ............. | H04N 5/23203 |
| 2018/0052800 A1* | 2/2018 | Lee ..................... | G06F 13/4282 |
| 2018/0060270 A1* | 3/2018 | Schnell ............... | G06F 13/4022 |
| 2019/0075338 A1* | 3/2019 | Liao ................... | H04N 21/43632 |

FOREIGN PATENT DOCUMENTS

| | | |
|---|---|---|
| TW | M525481 U | 7/2016 |
| TW | I554113 B | 10/2016 |
| TW | 201717609 A | 5/2017 |

\* cited by examiner

VIDEO SIGNAL TRANSMISSION SWITCHING APPARATUS

BACKGROUND OF THE INVENTION

Field of the Invention

The present invention relates to to video signal transmission, and in particular, it relates to a switching apparatus for video signal transmission.

Description of Related Art

USB Type-C, also referred to as USB-C, is a hardware interface for Universal Serial Bus (USB). On its exterior, the upper side and lower side are identical, so the user no longer needs to distinguish the correct vs. incorrect sides, and can plug it into a receiving slot in either direction. Compared to previous USB standards, in addition to faster data transmission, it can also support DisplayPort, for connecting to high definition display screen and high quality speaker, to output high quality video and audio signals. Because a single USB-C cable can transmit both data and video and audio signals, and the transmission speed and quality are both superior to previous standards, USB-C related applications are being rapidly developed in relevant industries.

However, when USB Type-C is used with video signal switching apparatus, there are compatibility issues. Typically, a video signal switching apparatus is coupled to both video signal source devices (such as computers or video players) and display devices. Due to limitations caused by compatibility issues, the user is required to use a particular connection order, i.e., to first connect the display devices to the video signal switching apparatus, and then connect the video signal source devices (computers or video players) to the video signal switching apparatus, in order to properly operate the system. The system cannot operate property in the opposite connection order. This limitation causes inconvenience for users in practice.

SUMMARY

Accordingly, the present invention is directed to a video signal switching apparatus that substantially obviates one or more of the problems due to limitations and disadvantages of the related art.

One embodiment of the present invention provides a video signal switching apparatus. In this embodiment, the video signal switching apparatus is connected between a video signal source device and a plurality of display devices. The video signal switching apparatus includes a controller, a USB Type-C interface, a plurality of video output interfaces, and a switching module. The controller is coupled to the video signal source the via the USB Type-C interface, wherein the USB Type-C interface includes at least one specific channel. The controller is coupled to the plurality of display devices via the plurality of video output interfaces. The switching module is coupled at one end to the specific channel of the USB Type-C interface and at another end to the plurality of video output interfaces. The switching module is configured to detect a specific signal generated by one of the display devices, and based thereon, to generate a signal on the specific channel of the USB Type-C interface, and wherein the controller re-performs handshaking with the video signal source based on detecting the signal on the specific channel.

In one embodiment, based on detecting the specific signal, the switching module changes a voltage of the specific channel as the signal on the specific channel to control the re-performance of handshaking.

In one embodiment, the switching module changes the voltage on the specific channel from a first voltage to a second voltage and then back to the first voltage, the second voltage being different from the first voltage.

In one embodiment, the switching module includes a control unit and a switch unit. The control unit is coupled to the plurality of video output interfaces, and is configured to detect the specific signal and based thereon, generate a control signal. The switch unit is coupled between the control unit and the specific channel, and is configured to generate, based on the control signal generated by the control unit, the signal on the specific channel.

In one embodiment, the switching module and the controller are integrated together as one unit.

In one embodiment, the specific channel of the USB Type-C interface is a configuration channel (CC) of the USB Type-C interface.

In one embodiment, the specific channel of the USB Type-C interface is a sideband use channel (SBU) of the USB Type-C interface.

Another embodiment of the present invention provides a video signal switching apparatus. In this embodiment, the video signal switching apparatus is connected between a plurality of video signal source devices and a display device. The video signal switching apparatus includes a controller, a plurality of USB Type-C interfaces, a video output interface, and a switching module. The controller is coupled to the plurality of video signal sources via the plurality of USB Type-C interfaces, wherein each USB Type-C interface includes at least one specific channel. The controller is coupled to the display device via the video output interface. The switching module is coupled at one end to the specific channels of the plurality of USB Type-C interfaces and at another end to the video output interface. The switching module is configured to detect a specific signal generated by the display device, and based thereon, to generate a signal on at least one of the specific channels of the plurality of USB Type-C interfaces, and wherein the controller re-performs handshaking with the corresponding one of the plurality of video signal sources in response to detecting the signal on the at least one specific channel.

Another embodiment of the present invention provides a video signal switching apparatus. In this embodiment, the video signal switching apparatus is connected between a plurality of video signal source devices and a plurality of display devices. The video signal switching apparatus includes a controller, a plurality of USB Type-C interfaces, a plurality of video output interfaces, and a switching module. The controller is coupled to the plurality of video signal sources via the plurality of USB Type-C interfaces, wherein each USB Type-C interface includes at least one specific channel. The controller is coupled to the plurality of display devices via the plurality of video output interfaces. The switching module is coupled at one end to the specific channels of the plurality of USB Type-C interfaces and at another end to the plurality of video output interfaces. The switching module is configured to detect a specific signal generated by one of the plurality of display devices, and based thereon, to generate a signal on at least one of the specific channels of the plurality of USB Type-C interfaces, and wherein the controller re-performs handshaking with the corresponding one of the plurality of video signal sources in response to detecting the signal on the at least one specific channel.

Compared to conventional technologies, the video signal switching apparatus of the present embodiments can solve the compatibility problem of the conventional technologies, so that the connection order of connecting the video signal source devices and the display devices to the video signal switching apparatus is not limited to any particular order. The use does not need to unplug and then re-plug the USB Type-C cable and the system can still operate properly. Thus, the limitation of the conventional technologies are eliminated, and the system is more convenient to use.

Embodiments of the present invention are described in detail with reference to the following drawings.

DETAILED DESCRIPTION OF PREFERRED EMBODIMENTS

One embodiment of the present invention is a video signal switching apparatus. In this embodiment, the video signal switching apparatus is used in a scenario with a single video signal source device (Source) and multiple display devices (Sinks). In other words, the video signal switching apparatus is coupled between a single video signal source device and multiple display devices.

Figure 1:
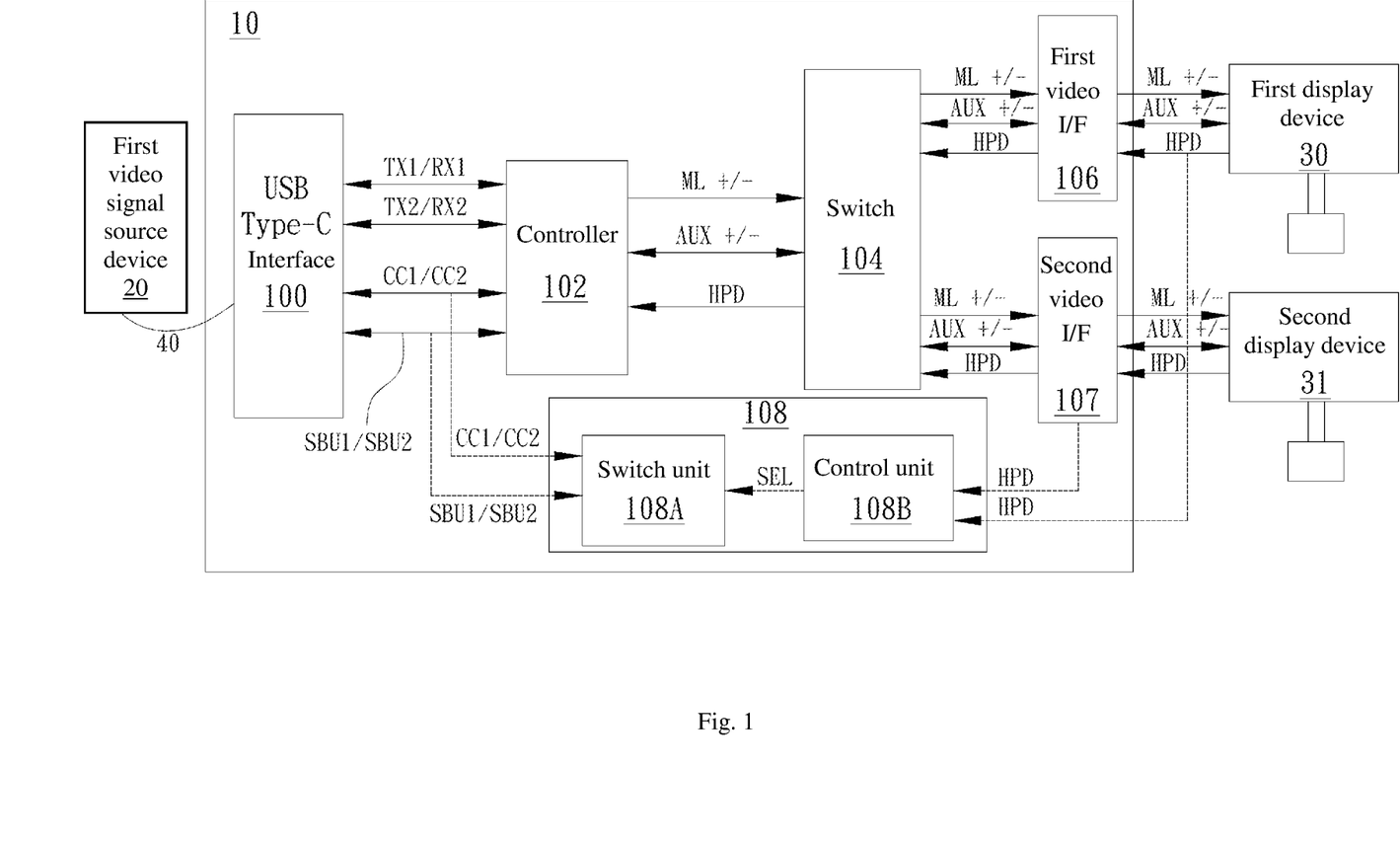
FIG. 1 is a functional block diagram of a video signal switching apparatus according to an embodiment of the present invention.

Refer to FIG. 1, which is a functional block diagram of a video signal switching apparatus according to this embodiment. As shown in FIG. 1, the video signal switching apparatus 10 in this embodiment is coupled between a single video signal source device (first video signal source device 20) and two display devices (first display device 30 and second display device 31).

In this embodiment, the video signal switching apparatus 10 includes a first USB Type-C interface 100, a controller 102, a switch 104, a first video output interface 106, a second video output interface 107, and a switching module 108. The first USB Type-C interface 100 is coupled to the first video signal source device 20 via a USB Type-C cable 40. The controller 102 is coupled between the first USB Type-C interface 100 and the switch 104. The controller 102 is coupled, via the switch 104, to the first video output interface 106 and second video output interface 107, and in turn coupled to the first display device 30 and the second display device 31 via the respective first video output interface 106 an the second video output interface 107.

The controller 102 is coupled to the first video signal source device 20 via the first USB Type-C interface 100, to transmit the transmit/receive signals (such as TX1/RX1, TX2/RX2), the configuration channel signals CC1/CC2, and sideband use channel signals SBU1/SBU2, etc.

The first USB Type-C interface 100 includes at least one specific channel. The specific channel may be the configuration channel (CC) that transmits the configuration channel signals CC1/CC2, and/or the sideband use channel (SBU) that transmits the sideband use channel signals SBU1/SBU2, but is not limited to such.

The controller 102 is coupled, via the switch 104, to the first video output interface 106 and second video output interface 107, and in turn coupled to the first display device 30 and the second display device 31 via the respective first video output interface 106 an the second video output interface 107. The switch 104 may be a one-to-two or one-to-many multiplexer, which can selectively transmit signals to a selected video output interface (such as the first video output interface 106 or the second video output interface 107 in this embodiment). The controller 102 and the switching module 108 may be integrated together as one unit or may be separate devices, without limitation.

In this embodiment, the controller 102 transmits main channel signal ML+/− or auxiliary channel signal AUX+/− to the switch 104, and then via the first video output interface 106 and second video output interface 107 respectively, transmit main channel signal ML+/− or auxiliary channel signal AUX+/− to the first display device 30 or the second display device 31. The first display device 30 and the second display device 31 respectively output hot plug detect signal HPD or auxiliary channel signals AUX+/− to the first video output interface 106 and the second video output interface 107, and the hot plug detect signal HPD or auxiliary channel signal AUX+/− are in turn transmitted to the controller 102 via the switch 104.

The switching module 108 is coupled at one end to the specific channel of the first USB Type-C interface 100 (such as the configuration channel that transmits the configuration channel signals CC1/CC2 and/or the sideband use channel that transmits the sideband use channel signals SBU1/SBU2), and coupled at the other end to the first video output interface 106 and the second video output interface 107. In this embodiment, the switching module 108 detects a specific signal (such as the hot plug detect signal HPD or auxiliary channel signals AUX+/−) from the first display device 30 or the second display device 31, and based on the specific signal, controls the specific channel of the first USB Type-C interface 100 (such as the configuration channel and/or the sideband use channel) to re-perform handshaking between the video signal switching apparatus 10 and the first video signal source device 20.

For example, when the switching module 108 detects at least one specific signal (such as the hot plug detect signal HPD or auxiliary channel signals AUX+/−) from the first display device 30 or the second display device 31, the switching module 108 will change the voltage on the specific channel of the first USB Type-C interface 100 (such as the configuration channel and/or the sideband use channel), so as to control the specific channel to re-perform handshaking.

In practice, one way the switching module 108 changes the voltage on the specific channel of the first USB Type-C interface 100 is to change it from a first voltage to a second voltage which is different from the first voltage, and then change it back to the first voltage. In other words, the voltage change may a change from a low voltage to a high voltage followed by a change back to the low voltage, or a change from a high voltage to a low voltage followed by a change back to the high voltage.

In this embodiment, the above voltage change performed by the switching module 108 on the specific channel of the first USB Type-C interface 100 can simulate an unplugging and plugging of the USB Type-C cable 40 between the first USB Type-C interface 100 and the first video signal source device 20. This way, when the controller 102 detects the second voltage, it will deem the first video signal source device 20 to have been unplugged, and subsequently when it detects a return from the second voltage to the first voltage, it will deem the first video signal source device 20 to have been plugged in. Therefore, after the user plugs in the sink device, the user does not need to manually unplug and re-plug in the source device (which was the required connection order in the conventional system), and the controller 102 can still deem the first video signal source device 20 to have been unplugged and then plugged in. Thus, the limitation of the conventional system is overcome, although the invention is not limited to this effect.

More specifically, the USB Type-C standard defines the circuit design for the Configuration Channel (CC) of the source and the sink devices. Within the source device, the two CC pins are coupled to a positive voltage via resistors, and within the sink, the two CC pins are coupled to ground via resistors. The resistors in the source and the resistors in the sink may have different values. When the source and sink are connected to each other (for example by a USB Type-C cable or direct plugging), one CC pin in the source and one CC pin in the sink are electrically coupled to each other (for example by a conductor of the cable), so the voltage of the CC pins becomes an intermediate voltage due to voltage division. In other words, the voltage on the CC pin of the source decreases from the positive voltage to the intermediate voltage, and the voltage on the CC pin of the sink increases from the ground voltage to the intermediate voltage. When the source and the sink are connected via the USB Type-C interface, the signals on the CC pins cause the source and sink to enter the Alt mode of the communication standard that are being used by the source and sink devices (for example, if the source and sink are DisplayPort devices, they will enter the DisplayPort Alt mode). The Alt mode allows the source and sink devices to transmit data using the USB Type-C interface.

Handshaking is a process carried out by the controller 102 (acting as a sink) with the source device 20 to establish communication between them according to the interface standard that are being used by them, such as DisplayPort, High-Definition Multimedia Interface (HDMI), etc. The specific steps in the handshaking process by the controller 102 are defined by the specific interface standard, which are familiar to those skilled in the relevant art and will not be described in detail here. In a conventional device, handshaking is trigged when the source and sink are just connected (e.g. the sink is plugged into the source) and a signal such as a voltage change on the relevant pins is detected. In embodiments of the present invention, the switching module 108 is provided which, upon detecting the specific signal (e.g. HPD) from the display device (sink), can control the specific channel of the USB Type-C interface (e.g. to produce a voltage change) so as to simulate a plugging event, which triggers the controller 102 to re-perform handshaking. As a result, a correct connecting order—first connecting the display device, then connecting the source device—is simulated, which ensures the proper operation of the video signal switching apparatus.

It should be noted that the location where the one end of the switching module 108 is coupled to the specific channel of the first USB Type-C interface 100 (such as the configuration channel and/or the sideband use channel) is not limited. For example, the switching module 108 may be coupled to a location between the first USB Type-C interface 100 and the first video signal source device 20, or alternatively coupled to a location between the first USB Type-C interface 100 and the controller 102, so long as the one end of the switching module 108 is coupled to the specific channel of the first USB Type-C interface 100 (such as the configuration channel and/or the sideband use channel).

Similarly, while the other end of the switching module 108 may be coupled to the first video output interface 106 and the second video output interface 107, it can alternatively be coupled to a location between the first video output interface 106 and the first display device 30 and to a location between the second video output interface 107 and the second display device 31, or it can alternatively be couple to a location between the first video output interface 106 and the switch 104 and to a location between the second video output interface 107 and the switch 104. So long as the switching module 108 can detect the specific signal (such as the hot plug detect signal HPD or auxiliary channel signals AUX+/−) from the first display device 30 and the second display device 31, the coupling locations are not specifically limited.

In one embodiment, as shown in FIG. 1, the switching module 108 may include a switch unit 108A and a control unit 108B. The switch unit 108A is coupled between the control unit 108B and the specific channel of the first USB Type-C interface 100 (such as the configuration channel and/or the sideband use channel), and the control unit 108B is coupled to the first video output interface 106 and the second video output interface 107. When the control unit 108B detects the at least one specific signal (such as the hot plug detect signal HPD or auxiliary channel signals AUX+/−) from the first display device 30 or the second display device 31, the control unit 108B generates control signal SEL based thereon and transmits the control signal to the switch unit 108A. When the switch unit 108A receives the control signal SEL, based on the control signal, the switch unit 108A controls the specific channel (such as the configuration channel and/or the sideband use channel) to re-perform handshaking between the first USB Type-C interface 100 and the controller 102.

It should be noted that under the alternative mode (Alt Mode) of DisplayPort, the video signal switching apparatus 10 can receive video signal from the first video signal source device 20 via the first USB Type-C interface 100, and can output, via the first video output interface 106 and/or the second video output interface 107, the main channel signals ML+/− including the video signal to the first display device 30 and/or the second display device 31. Further, the first video output interface 106 and the second video output interface 107 may be a DisplayPort interface, a Thunderbolt3 interface, or a splitter of an HDMI (High-Definition Multimedia Interface) interface, without limitation.

Although the above embodiment uses an example where the video signal switching apparatus 10 is coupled between a single video signal source device (the first video signal source device 20) and two display devices (the first display device 30 and the second display device 31), the video signal switching apparatus 10 in fact can have N video output interfaces depending on practical need, and can be coupled to N display devices via the N video output interfaces respectively, where N is a positive integer and N≥2.

Another embodiment of the present invention is another video signal switching apparatus. In this embodiment, the video signal switching apparatus is used in a scenario with multiple video signal source devices (Sources) and a single display device (Sink). In other words, the video signal switching apparatus is coupled between multiple video signal source devices and a single display device.

Figure 2:
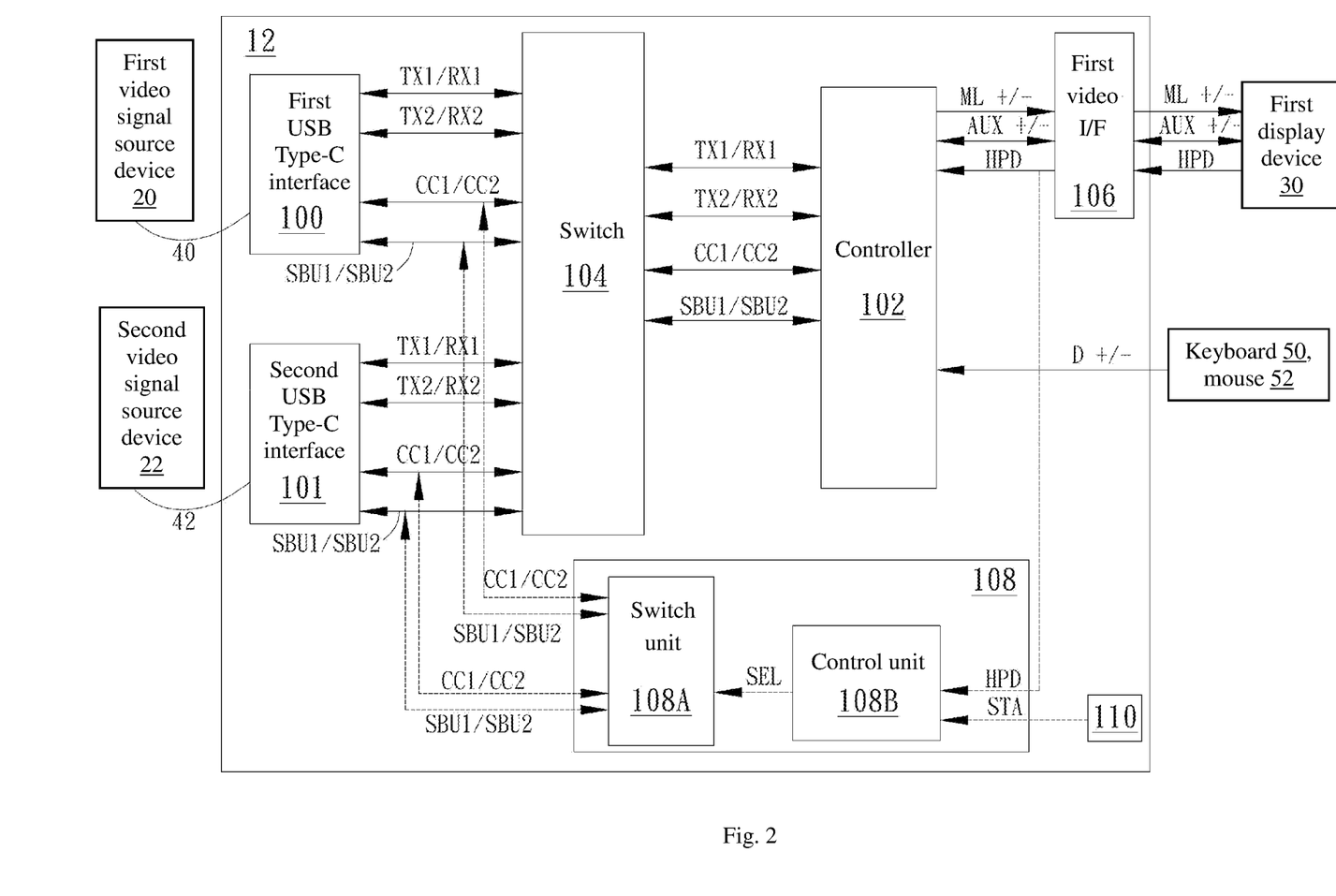
FIG. 2 is a functional block diagram of another video signal switching apparatus according to another embodiment of the present invention.

Refer to FIG. 2, which is a functional block diagram of a video signal switching apparatus according to this embodiment. As shown in FIG. 2, the video signal switching apparatus 12 in this embodiment is coupled between two video signal source devices (first video signal source device 20 and second video signal source device 22) and a single display device (first display device 30).

The video signal switching apparatus 12 includes a first USB Type-C interface 100, a second USB Type-C interface 101, a controller 102, a switch 104, a first video output interface 106, a switching module 108, and a startup unit 110. The first USB Type-C interface 100 is coupled to the first video signal source device 20 via a USB Type-C cable 40, and the second USB Type-C interface 101 is coupled to the second video signal source device 22 via a USB Type-C cable 42. The controller 102 is coupled to the first USB Type-C interface 100 and the second USB Type-C interface 101 via the switch 104, and in turn coupled to the first video signal source device 20 and the second video signal source device 22 via the respective first USB Type-C interface 100 and the second USB Type-C interface 101. The controller 102 is coupled at one end to the switch 104, and coupled at the other end to the first video output interface 106 and a peripheral input device (such as keyboard 50 and mouse 52, without limitation). The first video output interface 106 is coupled to the first display device 30.

In this embodiment, by using the switch 104, the video signal switching apparatus 12 switches between the first USB Type-C interface 100 and the second USB Type-C interface 101, so as to selectively couple the controller 102 to either the first video signal source device 20 or the second video signal source device 22. In other words, the video signal switching apparatus 12 uses the switch 104 to switch to different video signal source devices.

When the switch 104 is switched to the first USB Type-C interface 100, the controller 102 is coupled to the first video signal source device 20 via the switch 104 and the first USB Type-C interface 100, to transmit the transmit/receive signal (such as TX1/RX1, TX2/RX2), the configuration channel signal CC1/CC2, and sideband use channel signal SBU1/SBU2, etc. The first USB Type-C interface 100 includes at least one specific channel.

When the switch 104 is switched to the second USB Type-C interface 101, the controller 102 is coupled to the second video signal source device 22 via the switch 104 and the second USB Type-C interface 101, to transmit the transmit/receive signal (such as TX1/RX1, TX2/RX2), the configuration channel signal CC1/CC2, and sideband use channel signal SBU1/SBU2, etc. The second USB Type-C interface 101 includes at least one specific channel.

The above specific channels may be the configuration channel (CC) that transmits the configuration channel signals CC1/CC2, and/or the sideband use channel (SBU) that transmits the sideband use channel signals SBU1/SBU2, but are not limited to such.

The controller 102 is coupled to the first display device 30 via the first video output interface 106. The controller 102 and the switching module 108 may be integrated together as one unit or may be separate devices, without limitation.

In this embodiment, the controller 102 transmits main channel signal ML+/− or auxiliary channel signal AUX+/− to the first display device 30 via the first video output interface 106. The first display device 30 outputs hot plug detect signal HPD or auxiliary channel signal AUX+/− to the first video output interface 106, and the first video output interface 106 in turn transmits the hot plug detect signal HPD or auxiliary channel signals AUX+/− to the controller 102. The controller 102 can also receive input signal D+/− from the peripheral input device (such as keyboard 50 and mouse 52).

The switching module 108 is coupled at one end to the specific channels of the first USB Type-C interface 100 and the second USB Type-C interface 101 (such as the configuration channels that transmit the configuration channel signals CC1/CC2 and/or the sideband use channels that transmit the sideband use channel signals SBU1/SBU2), and coupled at the other end to the first video output interface 106. In this embodiment, the switching module 108 detects a specific signal (such as the hot plug detect signal HPD or auxiliary channel signals AUX+/−) from the first display device 30, and based thereon, controls the specific channels of the first USB Type-C interface 100 and/or the second USB Type-C interface 101 (such as the configuration channels and/or the sideband use channels) to re-perform handshaking between the video signal switching apparatus 12 and the video signal source devices. Note that the switching module 108 controls only the USB Type-C interface that is currented switched to the display device.

For example, when the switching module 108 detects the at least one specific signal (such as the hot plug detect signal HPD or auxiliary channel signals AUX+/−) from the first display device 30, the switching module 108 will change the voltage on the specific channel of the first USB Type-C interface 100 and/or the second USB Type-C interface 101 (such as the configuration channel and/or the sideband use channel), so as to control the specific channel of the first USB Type-C interface 100 and/or the second USB Type-C interface 101 to re-perform handshaking.

In practice, one way the switching module 108 changes the voltage on the specific channel is to change it from a first voltage to a second voltage which is different from the first voltage, and then change it back to the first voltage. In other words, the voltage change may be a change from a low voltage to a high voltage followed by a change back to the low voltage, or a change from a high voltage to a low voltage followed by a change back to the high voltage. The above voltage change performed by the switching module 108 can simulate an unplugging and plugging of the USB Type-C cable 40 between the first USB Type-C interface 100 and the first video signal source device 20 and/or of the USB Type-C cable 42 between the second USB Type-C interface 101 and the second video signal source device 22. This way, when the controller 102 detects the second voltage, it will deem the first video signal source device 20 or the second video signal source device 22 to have been unplugged, and subsequently when it detects a return from the second voltage to the first voltage, it will deem the first video signal source device 20 or the second video signal source device 22 to have been plugged in. Therefore, the user does not need to manually perform unplugging and plugging operations, as required by the conventional system, and the controller 102 can still deem the first video signal source device 20 or the second video signal source device 22 to have been unplugged and then plugged in. Thus, the limitation of the conventional system is overcome, although the invention is not limited to this effect.

It should be noted that the location where the one end of the switching module 108 is coupled to the specific channels (such as the configuration channels and/or the sideband use channels) is not limited. For example, the switching module 108 may be coupled to a location between the first USB Type-C interface 100 and the first video signal source device 20 and to a location between the second USB Type-C interface 101 and the second video signal source device 22, or alternatively coupled to a location between the first USB Type-C interface 100 and the switch 104 and to a location between the second USB Type-C interface 101 and the switch 104, or alternatively to a location between the switch 104 and the controller 102, so long as the one end of the switching module 108 is coupled to the specific channels (such as the configuration channels and/or the sideband use channels).

Similarly, while the other end of the switching module 108 may be coupled to the first video output interface 106, it can alternatively be coupled to a location between the first video output interface 106 and the first display device 30, or it can alternatively be couple to a location between the first video output interface 106 and the controller 102. So long as the switching module 108 can detect the specific signal (such as the hot plug detect signal HPD or auxiliary channel signals AUX+/−) of the first display device 30, the coupling locations are not specifically limited.

In one embodiment, as shown in FIG. 2, the switching module 108 may include a switch unit 108A and a control unit 108B. The switch unit 108A is coupled between the control unit 108B and the specific channels (such as the configuration channels and/or the sideband use channels), and the control unit 108B is coupled to the first video output interface 106. When the control unit 108B detects the at least one specific signal (such as the hot plug detect signal HPD or auxiliary channel signals AUX+/−) from the first display device 30, the control unit 108B generates control signal SEL based thereon and sends the control signal to the switch unit 108A. When the switch unit 108A receives the control signal SEL, based thereon, the switch unit 108A controls the specific channels (such as the configuration channels and/or the sideband use channels) to re-perform handshaking between the first USB Type-C interface 100 and the controller 102 or between the second USB Type-C interface 101 and the controller 102.

Further, the video signal switching apparatus 12 can also include a startup unit 110. The startup unit 110 is coupled to the control unit 108B of the switching module 108. When the startup unit 110 is started up, the startup unit 110 generates a startup signal STA and transmits it to the control unit 108B. In response, the control unit 108B generates a control signal SEL and transmits it to the switch unit 108A. Based on the control signal, the switch unit 108A controls the specific channels to re-perform handshaking. In practice, the startup unit 110 may be a switching push button, such as and without limitation, a push button in a keyboard-video-mouse switch device used to switch different input ports.

Although the above embodiment uses an example where the video signal switching apparatus 12 is coupled between two video signal source devices (the first video signal source device 20 and the second video signal source device 22) and a single display devices (the first display device 30), the video signal switching apparatus 12 in fact can have M USB Type-C interfaces depending on practical need, and can be coupled to M video signal source devices via the M USB Type-C interfaces respectively, where M is a positive integer and M≥2.

Another embodiment of the present invention is a video signal switching apparatus. In this embodiment, the video signal switching apparatus is used in a scenario with multiple video signal source devices (Sources) and multiple display devices (Sinks). In other words, the video signal switching apparatus is coupled between multiple video signal source devices and multiple display devices.

Figure 3:
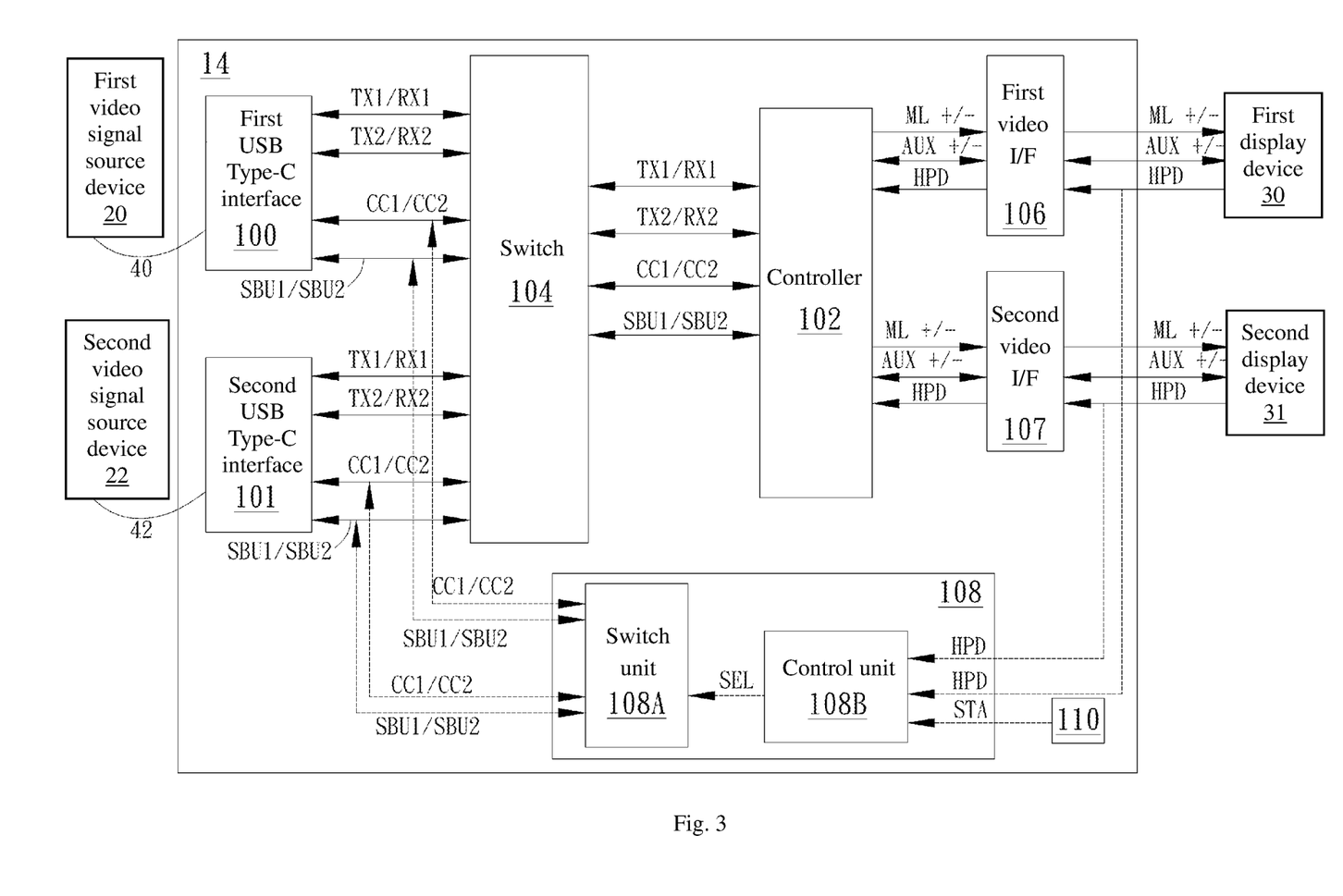
FIG. 3 is a functional block diagram of yet another video signal switching apparatus according to yet another embodiment of the present invention.

Refer to FIG. 3, which is a functional block diagram of a video signal switching apparatus according to this embodiment. As shown in FIG. 3, the video signal switching apparatus 14 in this embodiment is coupled between two video signal source device (first video signal source device 20 and second video signal source device 22) and two display devices (first display device 30 and second display device 31).

In this embodiment, the video signal switching apparatus 14 includes a first USB Type-C interface 100, a second USB Type-C interface 101, a controller 102, a switch 104, a first video output interface 106, a second video output interface 107, and a switching module 108. The first USB Type-C interface 100 is coupled to the first video signal source device 20 via a USB Type-C cable 40, and the second USB Type-C interface 101 is coupled to the second video signal source device 22 via a USB Type-C cable 42. The controller 102 is coupled to the first USB Type-C interface 100 and the second USB Type-C interface 101 via the switch 104, and is in turn coupled, via the first USB Type-C interface 100 and the second USB Type-C interface 101, to the first video signal source device 20 and the second video signal source device 22. The controller 102 is coupled at one end to the switch 104, and coupled at another end to the first video output interface 106 and second video output interface 107, and in turn coupled to the first display device 30 and the second display device 31 via the respective first video output interface 106 an second video output interface 107.

In this embodiment, by using the switch 104, the video signal switching apparatus 14 switches between the first USB Type-C interface 100 and the second USB Type-C interface 101, so as to selectively couple the controller 102 to either the first video signal source device 20 or the second video signal source device 22. In other words, the video signal switching apparatus 14 uses the switch 104 to switch to different video signal source devices.

When the switch 104 is switched to the first USB Type-C interface 100, the controller 102 is coupled to the first video signal source device 20 via the switch 104 and the first USB Type-C interface 100, to transmit the transmit/receive signal (such as TX1/RX1, TX2/RX2), the configuration channel signal CC1/CC2, and sideband use channel signal SBU1/SBU2, etc. The first USB Type-C interface 100 includes at least one specific channel.

When the switch 104 is switched to the second USB Type-C interface 101, the controller 102 is coupled to the second video signal source device 22 via the switch 104 and the second USB Type-C interface 101, to transmit the transmit/receive signal (such as TX1/RX1, TX2/RX2), the configuration channel signal CC1/CC2, and sideband use channel signal SBU1/SBU2, etc. The second USB Type-C interface 101 includes at least one specific channel.

The above specific channels may be the configuration channels that transmit the configuration channel signals CC1/CC2, and/or the sideband use channels that transmit the sideband use channel signals SBU1/SBU2, but are not limited to such.

The controller 102 is coupled to the first display device 30 and the second display device 31 via the respective first video output interface 106 and second video output interface 107. The controller 102 and the switching module 108 may be integrated together as one unit or may be separate devices, without limitation.

The controller 102 transmits main channel signals ML+/− or auxiliary channel signals AUX+/− to the first display device 30 and the second display device 31 via the respective first video output interface 106 and second video output interface 107. The first display device 30 and the second display device 31 output hot plug detect signal HPD or auxiliary channel signals AUX+/− to the respective first video output interface 106 and second video output interface 107, which in turn transmit the hot plug detect signal HPD or auxiliary channel signals AUX+/− to the controller 102.

The switching module 108 is coupled at one end to specific channels of the first USB Type-C interface 100 and the second USB Type-C interface 101 (such as the configuration channels that transmit the configuration channel signals CC1/CC2 and/or the sideband use channels that transmit the sideband use channel signals SBU1/SBU2), and coupled at the other end to the first video output interface 106 and second video output interface 107. In this embodiment, the switching module 108 detects a specific signal (such as the hot plug detect signal HPD or auxiliary channel signals AUX+/−) from the first display device 30 and/or the second display device 31, and based thereon, controls the specific channels of the first USB Type-C interface 100 and/or the second USB Type-C interface 101 (such as the configuration channels and/or the sideband use channels) to re-perform handshaking between the video signal switching apparatus and the video signal source devices. Note that in response to detecting a specific signal from one of the display devices, the switching module 108 controls only the USB Type-C interface that is currented switched to that display device.

For example, when the switching module 108 detects the at least one specific signal (such as the hot plug detect signal HPD or auxiliary channel signals AUX+/−) from the first display device 30 or the second display device 31, the switching module 108 will change the voltage on the specific channels of the first USB Type-C interface 100 and/or the second USB Type-C interface 101 (such as the configuration channels and/or the sideband use channels), so as to control the specific channels of the first USB Type-C interface 100 and/or the second USB Type-C interface 101 to re-perform handshaking.

In practice, the above voltage change may be to change it from a first voltage to a second voltage which is different from the first voltage, and then change it back to the first voltage. In other words, the voltage change may be a change from a low voltage to a high voltage followed by a change back to the low voltage, or a change from a high voltage to a low voltage followed by a change back to the high voltage. The above voltage change can simulate an unplugging and plugging of the USB Type-C cable 40 between the first USB Type-C interface 100 and the first video signal source device 20 and/or of the USB Type-C cable 42 between the second USB Type-C interface 101 and the second video signal source device 22. This way, when the controller 102 detects the second voltage, it will deem the first video signal source device 20 or the second video signal source device 22 to have been unplugged, and subsequently when it detects a return from the second voltage to the first voltage, it will deem the first video signal source device 20 or the second video signal source device 22 to have been plugged in. Therefore, the user does not need to manually perform unplugging and plugging operations, as required by the conventional system. Thus, the limitation of the conventional system is overcome, although the invention is not limited to this effect.

It should be noted that the locations where the one end of the switching module 108 is coupled to the specific channels (such as the configuration channels and/or the sideband use channels) are not limited. For example, the switching module 108 may be coupled to a location between the first USB Type-C interface 100 and the first video signal source device 20 and to a location between the second USB Type-C interface 101 and the second video signal source device 22, or alternatively coupled to a location between the first USB Type-C interface 100 and the switch 104 and to a location between the second USB Type-C interface 101 and the switch 104, or alternatively coupled to a location between the switch 104 and the controller 102, so long as the one end of the switching module 108 is coupled to the specific channels (such as the configuration channels and/or the sideband use channels).

Similarly, while the other end of the switching module 108 may be coupled to the first video output interface 106 and the second video output interface 107, it can alternatively be coupled to a location between the first video output interface 106 and the first display device 30 and to a location between the second video output interface 107 and the second display device 31, or it can alternatively be couple to a location between the first video output interface 106 and the controller 102 and to a location between the second video output interface 107 and the controller 102. So long as the switching module 108 can detect the specific signals (such as the hot plug detect signal HPD or auxiliary channel signals AUX+/−) of the first display device 30 and the second display device 31, the coupling locations are not specifically limited.

In one embodiment, as shown in FIG. 3, the switching module 108 may include a switch unit 108A and a control unit 108B. The switch unit 108A is coupled between the control unit 108B and the specific channels (such as the configuration channels and/or the sideband use channels), and the control unit 108B is coupled to the first video output interface 106 and the second video output interface 107. When the control unit 108B detects the at least one specific signal (such as the hot plug detect signal HPD or auxiliary channel signals AUX+/−) from the first display device 30 or the second display device 31, the control unit 108B generates control signal SEL based thereon and transmits the control signal to the switch unit 108A. When the switch unit 108A receives the control signal SEL, based thereon, the switch unit 108A controls the specific channels (such as the configuration channels and/or the sideband use channels) to re-perform handshaking between the first USB Type-C interface 100 and the controller 102 and between the second USB Type-C interface 101 and the controller 102.

Further, the video signal switching apparatus 14 can also include a startup unit 110. The startup unit 110 is coupled to the control unit 108B of the switching module 108. When the startup unit 110 is started up, the startup unit 110 generates a startup signal STA and transmits it to the control unit 108B. In response, the control unit 108B generates a control signal SEL and transmits it to the switch unit 108A. Based thereon, the switch unit 108A controls the specific channels to re-perform handshaking. In practice, the startup unit 110 may be a switching push button, such as and without limitation, a push button in a keyboard-video-mouse switch device used to switch different input ports.

Although the above embodiment uses an example where the video signal switching apparatus 14 is coupled between two video signal source devices (the first video signal source device 20 and the second video signal source device 22) and two display devices (the first display device 30 and the second display device 31), depending on practical need, the video signal switching apparatus 14 in fact can have M USB Type-C interfaces and N video output interfaces, and be respectively coupled to M video signal source devices via the M respective USB Type-C interfaces and to N display devices via the N respective video output interfaces, where M and N are both positive integers and M≥2, N≥2.

Compared to conventional technologies, the video signal switching apparatus of the present embodiments can solve the compatibility problem of the conventional technologies. Therefore, the order of connecting the video signal source devices and the display devices to the video signal switching apparatus is not limited; the user does not need to manually perform unplugging and plugging of the USB Type-C cables and the system can still operate properly. Thus, the limitation of the conventional system is overcome, and the system is more convenient to use.

The various components of the video signal switching apparatus described above may be implemented in electrical circuitry and/or computer executable program code stored in computer readable non-volatile memories.

It will be apparent to those skilled in the art that various modification and variations can be made in the video signal switching apparatus of the present invention without departing from the spirit or scope of the invention. Thus, it is intended that the present invention cover modifications and variations that come within the scope of the appended claims and their equivalents.

What is claimed is:

1. A video signal switching apparatus, connected between a video signal source device and a plurality of display devices, the video signal switching apparatus comprising:
   a controller;
   a USB Type-C interface, coupled to the controller, and configured to be coupled to the video signal source, wherein the USB Type-C interface includes at least one specific channel;
   a plurality of video output interfaces, which are separate from the USB Type-C interface, coupled to the controller, and configured to be respectively coupled to the plurality of display devices; and
   a switching module, coupled at one end to the specific channel of the USB Type-C interface and at another end to the plurality of video output interfaces,
   wherein the switching module is configured to detect a specific signal generated by one of the display devices, and based thereon, to generate a pre-defined signal on the specific channel of the USB Type-C interface, and wherein the controller re-performs handshaking with the video signal source in response to detecting the pre-defined signal on the specific channel.

2. The video signal switching apparatus of claim 1, wherein based on detecting the specific signal, the switching module changes a voltage of the specific channel as the pre-defined signal on the specific channel.

3. The video signal switching apparatus of claim 2, wherein the switching module changes the voltage on the specific channel from a first voltage to a second voltage and then back to the first voltage, the second voltage being different from the first voltage.

4. The video signal switching apparatus of claim 1, wherein the switching module includes:
   a control unit, coupled to the plurality of video output interfaces, configured to detect the specific signal and based thereon, generate a control signal; and
   a switch unit, coupled between the control unit and the specific channel, configured to generate, based on the control signal generated by the control unit, the pre-defined signal on the specific channel.

5. The video signal switching apparatus of claim 1, wherein the switching module and the controller are integrated together as one unit.

6. The video signal switching apparatus of claim 1, wherein the specific channel of the USB Type-C interface is a configuration channel (CC) of the USB Type-C interface.

7. The video signal switching apparatus of claim 1, wherein the specific channel of the USB Type-C interface is a sideband use channel (SBU) of the USB Type-C interface.

8. A video signal switching apparatus, connected between a plurality of video signal source devices and a display device, the video signal switching apparatus comprising:
   a controller;
   a plurality of USB Type-C interfaces, coupled to the controller, and configured to be respectively coupled to the plurality of video signal sources, wherein each USB Type-C interface includes at least one specific channel;
   a video output interface, which is separate from the plurality of USB Type-C interfaces, coupled to the controller, and configured to be coupled to the display device; and
   a switching module, coupled at one end to the specific channels of the plurality of USB Type-C interfaces and at another end to the video output interface,
   wherein the switching module is configured to detect a specific signal generated by the display device, and based thereon, to generate a pre-defined signal on at least one of the specific channels of the plurality of USB Type-C interfaces, and wherein the controller re-performs handshaking with a corresponding one of the plurality of video signal sources in response to detecting the pre-defined signal on the at least one specific channel.

9. The video signal switching apparatus of claim 8, wherein in response to detecting the specific signal, the switching module changes a voltage of the at least one specific channel as the pre-defined signal on the at least one specific channel.

10. The video signal switching apparatus of claim 9, wherein the switching module changes the voltage on the at least one specific channel from a first voltage to a second voltage and then back to the first voltage, the second voltage being different from the first voltage.

11. The video signal switching apparatus of claim 8, wherein the switching module includes:
    a control unit, coupled to the plurality of video output interfaces, configured to detect the specific signal and based thereon, generate a control signal; and
    a switch unit, coupled between the control unit and the specific channel, configured to generate, based on the control signal generated by the control unit, the pre-defined signal on the at least one specific channel.

12. The video signal switching apparatus of claim 8, wherein the switching module and the controller are integrated together as one unit.

13. The video signal switching apparatus of claim 8, wherein the specific channels of the plurality of USB Type-C interfaces are configuration channels (CC) of the USB Type-C interfaces.

14. The video signal switching apparatus of claim 8, wherein the specific channels of the plurality of USB Type-C interfaces are sideband use channels (SBU) of the USB Type-C interfaces.

15. The video signal switching apparatus of claim 8, further comprising:
    a startup unit, coupled to the switching module, configured to be started up and generate a startup signal for the switching module, wherein in response to the started up signal, the switching module generates the pre-defined signal on the at least one specific channel.

16. A video signal switching apparatus, connected between a plurality of video signal source devices and a plurality of display devices, the video signal switching apparatus comprising:
- a controller;
- a plurality of USB Type-C interfaces, coupled to the controller, and configured to be respectively coupled to the plurality of video signal sources, wherein each USB Type-C interface includes at least one specific channel;
- a plurality of video output interfaces, which are separate from the plurality of USB Type-C interfaces, coupled to the controller, and configured to be respectively coupled to the plurality of display devices; and
- a switching module, coupled at one end to the specific channels of the plurality of USB Type-C interfaces and at another end to the plurality of video output interfaces,
- wherein the switching module is configured to detect a specific signal generated by at least one of the plurality of display devices, and based thereon, to generate a pre-defined signal on at least one of the specific channels of the plurality of USB Type-C interfaces, and wherein the controller re-performs handshaking with a corresponding one of the plurality of video signal sources in response to detecting the pre-defined signal on the at least one specific channel.

17. The video signal switching apparatus of claim 16, wherein in response to detecting the specific signal, the switching module changes a voltage of the at least one specific channel as the pre-defined signal on the at least one specific channel.

18. The video signal switching apparatus of claim 17, wherein the switching module changes the voltage on the at least one specific channel from a first voltage to a second voltage and then back to the first voltage, the second voltage being different from the first voltage.

19. The video signal switching apparatus of claim 16, wherein the switching module includes:
- a control unit, coupled to the plurality of video output interfaces, configured to detect the specific signal and based thereon, generate a control signal; and
- a switch unit, coupled between the control unit and the specific channels of the plurality of first USB Type-C interfaces, configured to generate, based on the control signal generated by the control unit, the pre-defined signal on the at least one specific channel.

20. The video signal switching apparatus of claim 16, wherein the switching module and the controller are integrated together as one unit.

21. The video signal switching apparatus of claim 16, wherein the specific channels of the plurality of USB Type-C interfaces are configuration channels (CC) of the USB Type-C interfaces.

22. The video signal switching apparatus of claim 16, wherein the specific channels of the plurality of USB Type-C interfaces are sideband use channels (SBU) of the USB Type-C interfaces.

23. The video signal switching apparatus of claim 16, further comprising:
- a startup unit, coupled to the switching module, configured to be started up and generate a startup signal for the switching module, wherein in response to the started up signal, the switching module generates the pre-defined signal on the at least one specific channel.

* * * * *